UNITED STATES PATENT OFFICE 2,409,215

PRINTING INK

Ernest D. Lee, West Englewood, N. J., assignor to Interchemical Corporation, New York, N. Y., a corporation of Ohio No Drawing. Application December 27, 1943, Serial No. 515,802

2 Claims. (Cl. 106—30)

This invention relates to printing inks for typographic and lithographic printing of the resin solvent type, and aims to provide a printing ink of this type, characterized by low cost, good printing properties, inertness to rollers and blankets, and extremely rapid drying under heat.

Typographic and lithographic printing inks were for a long time made exclusively from drying oils. Recently, there have been introduced into the art inks of the type disclosed in the Gessler U. S. Patent No. 2,087,190, issued July 13, 1937, the vehicles of which comprise essentially solutions of binder in solvent which is relatively nonvolatile at ordinary room temperatures (ca 20° C.), but which volatilizes very rapidly from films (like ethyl alcohol at 20° C.) when heated to temperatures of the order of 150° C. These inks are ordinarily applied to paper and the like from conventional typographic printing presses, and the prints are then passed through ovens heated to 1000–2000° F. at such a speed that the paper does not exceed its scorching point. The solvent in the ink, which is non-volatile at room temperatures, so that the ink remains stable on the press, vaporizes almost immediately from the thin films at the elevated temperatures, thus drying the ink.

The problem of lithographic printing with such inks is complicated by the fact that lithographic printing is done by offsetting the ink onto a rubber or composition blanket, so that it becomes essential to find solvents which will have no substantial effect on the blankets. Such inks are disclosed in the Gessler et al. U. S. Patent No. 2,285,430, issued June 9, 1942; the inks therein disclosed have vehicles which comprise resins dissolved in specially treated petroleum hydrocarbons which have the content of aromatic and unsaturated compounds reduced to a dimethyl sulfate value of 4 or less, and preferably to a dimethyl sulfate value of 1 or less.

In the formulation of this type of ink for either typographic or lithographic printing, the choice of resin is extremely important, since resins vary considerably in their solvent retention; thus, using the same solvent, inks made from two different resins may dry at somewhat different rates. Furthermore, resins vary in solubility so that it may require more or less solvent to obtain a given body, and more or less solvent may have to be evaporated to get a film of the necessary dryness. In general, it has been the experience of the art that in order to obtain the desirable drying characteristics, relatively expensive resins are necessary.

I have invented a heat-drying ink for typographic and lithographic processes, characterized by its low cost and unusually rapid drying, combined with its almost complete inertness to fountain rollers, as compared with similar inks made from the conventional cheaper resins used in the normal production of such ink; the ink compares very favorably with the best inks heretofore obtainable, and shows a noticeable improvement in drying speed over the very best inks made from resins of comparable cost, heretofore available. My new inks comprise dispersions of pigment in solutions of certain resins derived from Utah coals, in petroleum hydrocarbons which are substantially non-drying at 20° C., and which evaporate rapidly at 150° C.

The resin may be obtained from Utah coals by the method described in the Green U. S. Patent No. 1,773,997, issued August 26, 1930. Such a resin, as obtained by the froth flotation technique, contains from 15 to 20% of finely divided coal, which is extremely difficult to separate from the resin. I have discovered that this difficulty is due to the presence in the resin of a small percentage (about 2 to 5%) of a resin which merely swells in hydrocarbon solvents, so that a solution prepared from the froth flotation concentrate will plug up a filter. According to the disclosures of my copending applications, Serial No. 515,803; Serial No. 515,804; and Serial No. 515,805, all filed on December 27, 1943, however, the desirable resin can be recovered from this froth flotation concentrate in any of several ways. For example, in accordance with the disclosure of my application, Serial No. 515,803, the flotation concentrate can be heated to an elevated temperature, advantageously on the order of 250 to 300° C., for a period, usually about 3 hours to 30 minutes, sufficient to render the entire resin content thereof soluble in hydrocarbon solvents such as petroleum naphtha and to produce freely filterable hydrocarbon solutions of the resin. The resulting heat-treated resin concentrate can then be dissolved in a hydrocarbon solvent, and the insoluble coal can be separated from the hydrocarbon solution by filtration.

Alternatively, as described in my application, Serial No. 515,804, the froth flotation concentrate can be treated with a solvent composed essentially of saturated hydrocarbons having six or less carbon atoms, hexane being especially suitable for this purpose. The resin content of the flotation concentrate is readily soluble in such a hydrocarbon solvent to form a freely filterable solution, and the insoluble coal can be separated by filtration. As disclosed in my application, Serial No. 515,805, the froth flotation concentrate can also be treated with diethyl ether, the resin content thereof being also readily soluble in such solvent to produce a freely filterable solution; and the insoluble coal can again be separated by filtration.

The resin containing the coal has a melting point (Fisher Johns method—see Eimer & Amend Catalog 90, p. 619) of about 185° C. The heat-treated separated resin has a melting point of about 178° C.; the hexane or ethyl ether separated resin has a melting point of about 190 to 192° C. All the resins have a low acid number, an iodine number of the order of 100 or thereabouts, and a gravity just above 1.0; they are largely hydrocarbon in character, typical analyses of the coal free resin giving about 86.5 to 87% C, and about 11.1% H.

In the production of black inks, the coal containing resin may be used, although the siliceous matter in the coal tends to cause plate wear. Heat solubilized resin, with the coal separated, is the preferred resin for black inks. Where other colors are to be used, the portion of the resin which is soluble in hexane alone gives by far the best results.

The resins may be dissolved in any petroleum hydrocarbons which are satisfactory from the point of view of press stability (i. e.—substantially non-drying at 60° F.) and which evaporate rapidly at 150° F. The resins are soluble in the very low solvency solvents described in U. S. Patent No. 2,285,430, as well as in more unsaturated solvents. With all these solvents, the resins show a tendency to lose solvent rapidly on being heated, so that very rapid drying is obtained, particularly as compared with the ordinary natural resins, or chemically modified natural resins. This rapid loss of solvent, which is comparable with the very best of the synthetic resins heretofore available, makes these new inks extremely useful.

Typical examples of the invention are the following:

*Example 1.—Black ink*

| | Parts by weight |
|---|---|
| Long carbon black pigment | 6.70 |
| Short carbon black pigment | 6.70 |
| Lamp black | 1.90 |
| Milori blue | 2.04 |
| Methyl violet toner | 1.20 |
| No. 1 body linseed oil | 1.50 |
| Talc | 2.70 |
| Paraffin wax | 2.70 |
| No. 5 body linseed oil | 2.70 |
| Varnish, consisting of 47.6 fused coal resin—coal removed, 53.4 petroleum solvent—dimethyl sulfate value 1.0—boiling range 240–255° C | 71.86 |

This ink was compared with an identical ink made from the best resin heretofore available for this type of ink—a rather expensive synthetic. The inks printed and dried equally well, and had almost identical press stability; the coal resin gave a somewhat higher gloss.

*Example 2.—Red ink*

| | Parts by weight |
|---|---|
| Benzidine yellow | .0050 |
| Eosine red | .2588 |
| Lecithin | .0151 |
| Petrolatum | .0290 |
| Coal resin (fused and decolorized) | .3851 |
| Petroleum solvent (dimethyl sulfate value 4.0—boiling range 230–250° C.) | .3070 |

This ink was an excellent heat-setting red.

*Example 3.—Blue ink*

| | Parts by weight |
|---|---|
| Peacock blue pigment | .2700 |
| Lecithin | .0135 |
| No. 5 linseed varnish | .0190 |
| Petrolatum | .0230 |
| Coal resin (hexane extracted) | .3435 |
| Solvent of Example 2 | .3310 |

Examples can of course be multiplied indefinitely without departing from the scope of the invention, which is defined in the claims.

I claim:

1. A heat drying printing ink comprising pigment dispersed in a vehicle which comprises a solution of coal resin free from coal in a petroleum hydrocarbon solvent which is substantially non-volatile at 20° C. and which volatilizes very readily when heated to temperatures of the order of 150° C., said coal resin comprising the portion soluble in hexane and lower saturated hydrocarbons of the resin concentrate consisting of resin admixed with coal and obtained from a resin-bearing coal of the Utah type.

2. A heat drying printing ink comprising pigment dispersed in a vehicle which comprises a solution of coal resin free from coal in a petroleum hydrocarbon solvent which is substantially non-volatile at 20° C. and which volatilizes very readily when heated to temperatures of the order of 150° C., said resin comprising the hydrocarbon-soluble resin resulting from the heat treatment at a temperature on the order of 250 to 300° C. of the resin concentrate consisting of resin admixed with coal and obtained from a resin-bearing coal of the Utah type.

ERNEST D. LEE.